(12) United States Patent
Xu et al.

(10) Patent No.: US 12,488,543 B2
(45) Date of Patent: Dec. 2, 2025

(54) DISTRIBUTED RENDERING OF DIGITAL OBJECTS IN AUGMENTED REALITY ENVIRONMENTS

(71) Applicant: INTERNATIONAL BUSINESS MACHINES CORPORATION, Armonk, NY (US)

(72) Inventors: Nuo Xu, Hangzhou (CN); Ze Wang, Beijing (CN); Ya Juan Dang, Beijing (CN); Yuhong Zou, Shanghai (CN); Yang Liang, Beijing (CN); Yuan Yuan Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 18/127,261

(22) Filed: Mar. 28, 2023

(65) Prior Publication Data
US 2024/0331309 A1 Oct. 3, 2024

(51) Int. Cl.
*G06T 19/00* (2011.01)
(52) U.S. Cl.
CPC .................................. *G06T 19/006* (2013.01)
(58) Field of Classification Search
None
See application file for complete search history.

(56) References Cited

U.S. PATENT DOCUMENTS

| 6,222,550 B1* | 4/2001 | Rosman ................ G06T 15/005 345/419 |
| 10,002,028 B2 | 6/2018 | Andoneih et al. |
| 10,699,467 B2* | 6/2020 | Hunt ...................... G06T 15/06 |
| 10,872,475 B2 | 12/2020 | Aluru et al. |

(Continued)

FOREIGN PATENT DOCUMENTS

| CN | 103106679 | 3/2016 |
| CN | 108885522 | 7/2021 |
| JP | 4779168 | 9/2011 |

OTHER PUBLICATIONS

Li, "Google launches persistent Cloud Anchors for creating AR layers over the real world", https://9to5google.com/2020/10/06/google-persistent-cloud-anchors/, Oct. 6, 2020, 6 pages.

(Continued)

*Primary Examiner* — David H Chu
(74) *Attorney, Agent, or Firm* — Joseph P. Curcuru; Andrew D. Wright; Calderon Safran & Wright P.C.

(57) ABSTRACT

Distributed rendering of digital objects in augmented reality environments includes a method, system, and computer program product that are configured to: receive a first space matrix from a first augmented reality (AR) device; receive a second space matrix from a second AR device; perform distributed rendering of a digital object for the first AR device and the second AR device in response to receiving the first space matrix and the second space matrix; transmit first image data to the first AR device, the first image data defining the first version of the first part of the digital object and the second part of the digital object; and transmit second image data to the second AR device, the second image data defining the second version of the first part of the digital object and the second part of the digital object.

20 Claims, 9 Drawing Sheets

(56) References Cited

U.S. PATENT DOCUMENTS

| | | | | |
|---|---|---|---|---|
| 2005/0228902 | A1* | 10/2005 | Lienhart | G06F 1/12 |
| | | | | 709/248 |
| 2006/0214949 | A1* | 9/2006 | Zhang | G06T 15/10 |
| | | | | 345/629 |
| 2010/0287485 | A1* | 11/2010 | Bertolami | G06F 3/011 |
| | | | | 715/764 |
| 2012/0242798 | A1* | 9/2012 | Mcardle | H04N 21/42202 |
| | | | | 348/46 |
| 2015/0032771 | A1* | 1/2015 | Berio | G06Q 50/01 |
| | | | | 707/769 |
| 2018/0315329 | A1* | 11/2018 | D'Amato | G09B 5/02 |
| 2020/0117484 | A1 | 4/2020 | Cavallo et al. | |
| 2020/0219322 | A1 | 7/2020 | Verma et al. | |
| 2020/0265598 | A1 | 8/2020 | Iyer et al. | |
| 2020/0279396 | A1* | 9/2020 | Komissarov | G06F 3/048 |
| 2020/0368616 | A1* | 11/2020 | Delamont | H04N 13/239 |
| 2021/0084198 | A1* | 3/2021 | Chen | G06T 5/73 |
| 2022/0179398 | A1 | 6/2022 | Putman et al. | |
| 2022/0337417 | A1* | 10/2022 | Sanders | H04L 67/34 |
| 2023/0052360 | A1* | 2/2023 | Oi | B64D 45/04 |
| 2023/0421902 | A1* | 12/2023 | Kang | G06T 5/20 |

OTHER PUBLICATIONS

Braud et al., "Future Networking Challenges: The Case of Mobile Augmented Reality", Jun. 8, 2017, 12 pages.

Anonymous, "Proxemics", Wikipedia, https://en.wikipedia.org/wiki/Proxemics, archived on Feb. 21, 2023, 12 pages.

Anonymous, "Cloud Anchors allow different users to share AR experiences", https://developers.google.com/ar/develop/cloud anchors, archived on Feb. 22, 2023, 5 pages.

Anonymous, "Working with Anchors", https://developers.google.com/ar/develop/anchors, archived on Feb. 22, 2023, 5 pages.

Anonymous, "RabbitMQ", Wikipedia, https://en.wikipedia.org/wiki/RabbitMQ, archived on Feb. 22, 2023, 3 pages.

Anonymous, "Fundamental concepts", https://developers.google.com/ar/develop/fundamentals, archived on Feb. 28, 2023, 4 pages.

Mur-Artal et al., "ORB-SLAM", https://webdiis.unizar.es/~raulmur/orbslam/#:~:text=ORB-SLAM, archived on Feb. 28, 2023, 5 pages.

Anonymous, "Simultaneous localization and mapping", Wikipedia, https://en.wikipedia.org/wiki/Simultaneous_localization_and_mapping, archived on Feb. 28, 2023, 5 pages.

* cited by examiner

DISTRIBUTED RENDERING OF DIGITAL OBJECTS IN AUGMENTED REALITY ENVIRONMENTS

BACKGROUND

Aspects of the present invention relate generally to augmented reality and, more particularly, to distributed rendering of digital objects in augmented reality environments.

The computing power of most augmented reality (AR) devices is low and unstable compared to that of backend (e.g., cloud) servers. The computing power of AR glasses is particularly limited because the small size of the glasses limits the size and amount of computing components that can be used. As such, it is advantageous to perform AR processing at a backend. However, doing so brings its own challenges. For example, backend processing is performed such that a digital object is rendered by a single server, which makes the rendering susceptible to single point failures and bottlenecks. Another issue with backend rendering of a digital object using a single server is that only one AR user can have a personalized interaction with the digital object at a time. For example, with the use of cloud anchors, a digital human in an AR environment can be shared amongst multiple AR devices; however, only one user can be served at a time by the digital human.

SUMMARY

In a first aspect of the invention, there is a computer-implemented method including: receiving a space matrix from an augmented reality (AR) device; in response to receiving the space matrix, performing distributed rendering of a digital object comprising rendering a first part of the digital object using a first pod running a first container in a computing cluster, and rendering a second part of the digital object using a second pod running a second container in the computing cluster; transmitting first data defining the first part of the digital object to the AR device; and transmitting second data defining the second part of the digital object to the AR device. In this manner, implementations of the invention provide for distributed rendering of a digital object for an AR device, wherein the distributed rendering provides the advantages of scalability and resiliency. In embodiments, the digital object comprises a digital human, the first part of the digital object comprises a head of the digital human, and the second part of the digital object comprises a body of the digital human. In this manner, implementations of the invention advantageously provide for distributed rendering of a digital human that can be included in an AR environment for the benefit of a user of the AR environment. The method may include: receiving another space matrix from a second AR device; rendering a different version of the first part of the digital object using a third pod running a third container in the computing cluster; transmitting a third data defining the different version of the first part of the digital object to the second AR device; and transmitting the second data defining the second part of the digital object to the second AR device, wherein the second AR device may be one or more AR devices that is not the first and/or primary AR device. In this manner, implementations of the invention provide the advantage of distributed rendering of two different versions of a same digital object for two different AR devices.

In another aspect of the invention, there is a computer program product including one or more computer readable storage media having program instructions collectively stored on the one or more computer readable storage media. The program instructions are executable to: receive a first space matrix from a first augmented reality (AR) device; receive a second space matrix from a second AR device; perform distributed rendering of a digital object for the first AR device and the second AR device in response to receiving the first space matrix and the second space matrix. The distributed rendering comprises: rendering a first version of a first part of the digital object using a first pod in a computing cluster; rendering a second version of the first part of the digital object using a second pod in the computing cluster; and rendering a second part of the digital object using a third pod in the computing cluster. The program instructions are executable to: transmit first image data to the first AR device, the first image data defining the first version of the first part of the digital object and the second part of the digital object; and transmit second image data to the second AR device, the second image data defining the second version of the first part of the digital object and the second part of the digital object. In this manner, implementations of the invention provide for distributed rendering of a digital object for two AR devices, wherein the distributed rendering provides the advantages of scalability and resiliency. In embodiments, the digital object comprises a digital human, the first part of the digital object comprises a head of the digital human, and the second part of the digital object comprises a body of the digital human. In this manner, implementations of the invention advantageously provide for distributed rendering of a digital human that can be included in an AR environment for the benefit of multiple users of the AR environment.

In another aspect of the invention, there is a system including a processor set, one or more computer readable storage media, and program instructions collectively stored on the one or more computer readable storage media. The program instructions are executable to: generate a space matrix; transmit the space matrix to a backend via an input queue; receive a first part of a digital object from the backend via a first output queue; receive a second part of the digital object from the backend via a second output queue; render the digital object by integrating the first part of the digital object and the second part of the digital object; and based on the rendering, display the digital object overlaid on an image of a real-world environment on a display of an augmented reality (AR) device.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
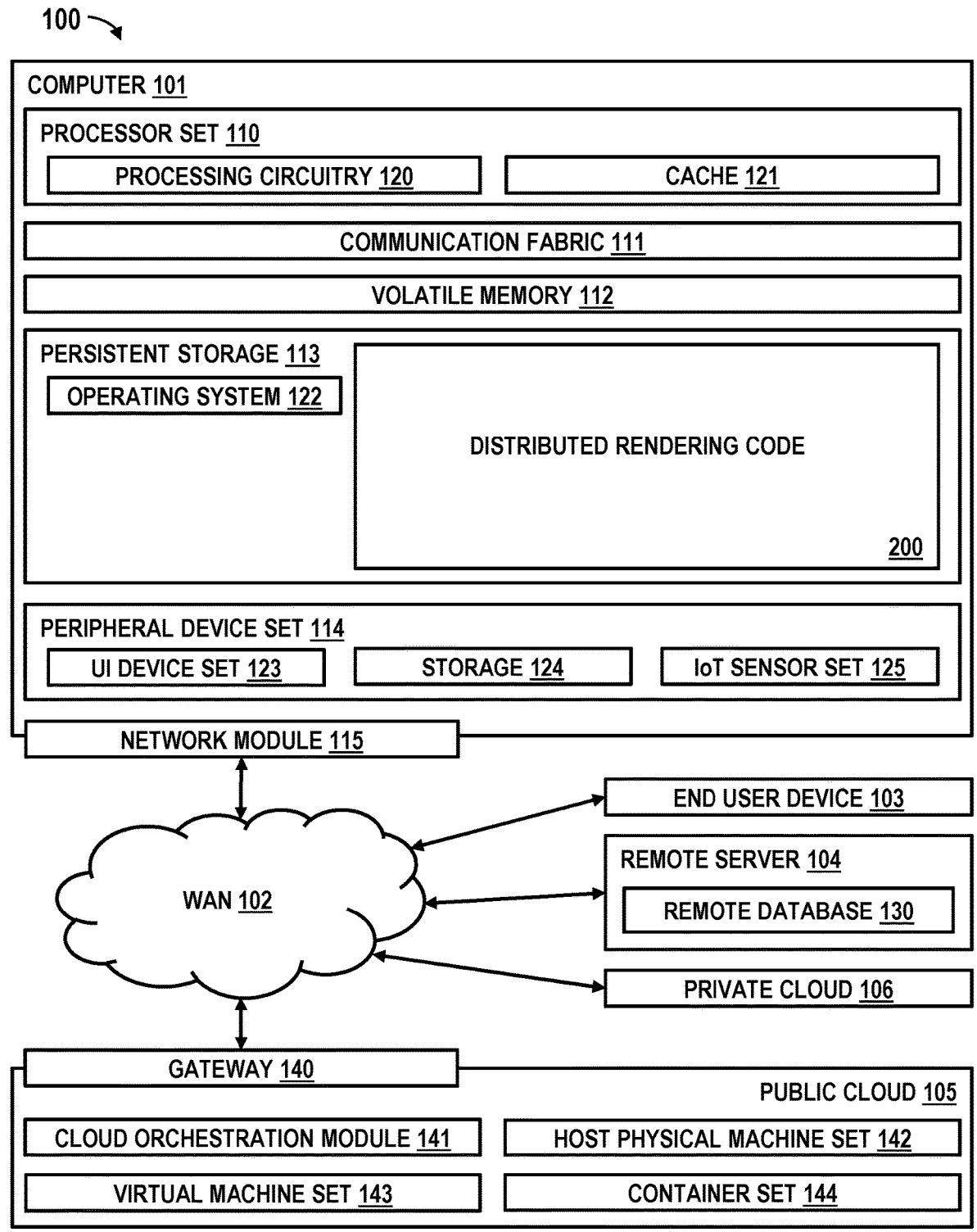
FIG. 1 depicts a computing environment according to an embodiment of the present invention.

Aspects of the present invention relate generally to augmented reality and, more particularly, to distributed rendering of digital objects in augmented reality (AR) environments. Implementations of the invention utilize a distributed network across multiple devices to render digital humans or other AR objects on AR devices. Embodiments integrate the technology of containers and AR rendering engines. To increase the stabilities of the AR rendering engines, embodiments utilize clusters rather than just one server. By rendering digital objects using a computing cluster than runs containerized applications, implementations of the invention advantageously provide high stability, high scalability, and lower maintenance cost compared to systems that render a digital object on a single server.

In AR environments, users that interact with a digital human are more likely to focus on the head and face of the digital human rather than the rest of the body of the digital human. Embodiments leverage this by rendering one part (e.g., body) of a digital human commonly for plural different AR devices, while rendering a unique view of another part (e.g., head and face) of the digital human for each respective one of the plural AR devices. Doing so saves computing resources by reducing the computing power used to render the digital human since the body is shared amongst the multiple AR devices.

Implementations of the invention utilize different containers in a computing cluster to perform the distributed rendering of different parts of a digital object. Performing the rendering in a containerized system provides for distributed rendering, which provides the advantages of high stability, high scalability, and lower maintenance cost. Performing the rendering in a containerized system advantageously permits the use of horizontal pod autoscaling to scale up the number of containers to meet a real time need.

Implementations of the invention utilize a messaging system comprising message queues to handle the large amounts of data involved in sending the rendered parts of the digital objects to different AR devices. The messaging system may comprise input queues and output queues. The input queues can be configured to transmit relatively less data including a space matrix from each AR device to a backend. In embodiments, each input queue works with multiple output queues that transmit image data from the backend to the AR device. In embodiments, the image data sent via the different output queues defines different parts of the digital object and may comprise an RGB (red-green-blue) binary file in which the frame comes from the rendering engine. Using a messaging system with message queues in this manner permits embodiments to display refreshes at a rate of ten frames per second.

In embodiments, each AR device pushes its space matrix to a message broker at the backend using an input message queue. The space matrix may be generated using a SLAM (simultaneous localization and mapping) algorithm run locally on the AR device, e.g., using a container. In embodiments, each AR device receives image data via messages in the plural output queues associated with the input queue and integrates the image data to generate the digital object as rendered by the backend. In embodiments, the messages received via the output queues include timestamps that the AR device uses to integrate the data when generating the digital object. In embodiments, the AR device generates an ideal time interval to receive the next message according to the computing power of the AR device. In embodiments, messages are dropped if the time difference between the timestamps is too large.

Implementations of the invention utilize a distributed network among multiple AR devices to enhance computing power. Embodiments render only one specific component (e.g., part) of a digital human uniquely for each user, and render at least one common component (e.g., part) of the digital human for all the users. In this manner, the system saves computing power while providing each user with a personalized AR experience. The specific component may include the head, face, and neck. The at least one common component may include body, arms, legs, and feet. In embodiments, the distributed network comprises a computing cluster in which different pods render different components of the digital human. The digital human can be divided into more components and rendered by more nodes to provide greater resolution. In this manner, implementations of the invention permit multiple AR device users to interact with one digital human at a location in an AR environment. The digital human can comprise, for example, staff at a desk such as those found in a railway station, airport, and hospital. In this manner, one digital human at an anchor in the AR environment can be rendered to serve multiple AR users at the same time, such that each AR user gets the impression that the digital human is interacting only with them.

As described herein, implementations of the invention provide a technical problem to the technical solution of digital objects that are rendered by single servers. The technical problem lies in the fact that the single server is more susceptible to failure and bottleneck, and also in the fact that a digital object rendered in this manner can only be rendered for one user at a time. The technical solution involves performing distributed rendering in a computing cluster using different containers to render different parts of the digital object. The technical solution provides the advantage of higher stability, higher scalability, and lower maintenance cost compared to systems that render a digital object on a single server. The technical solution also provides the advantage of permitting multiple AR device users to interact with one digital human at a location in an AR environment such that each AR user gets the impression that the digital human is interacting only with them.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as distributed rendering code at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
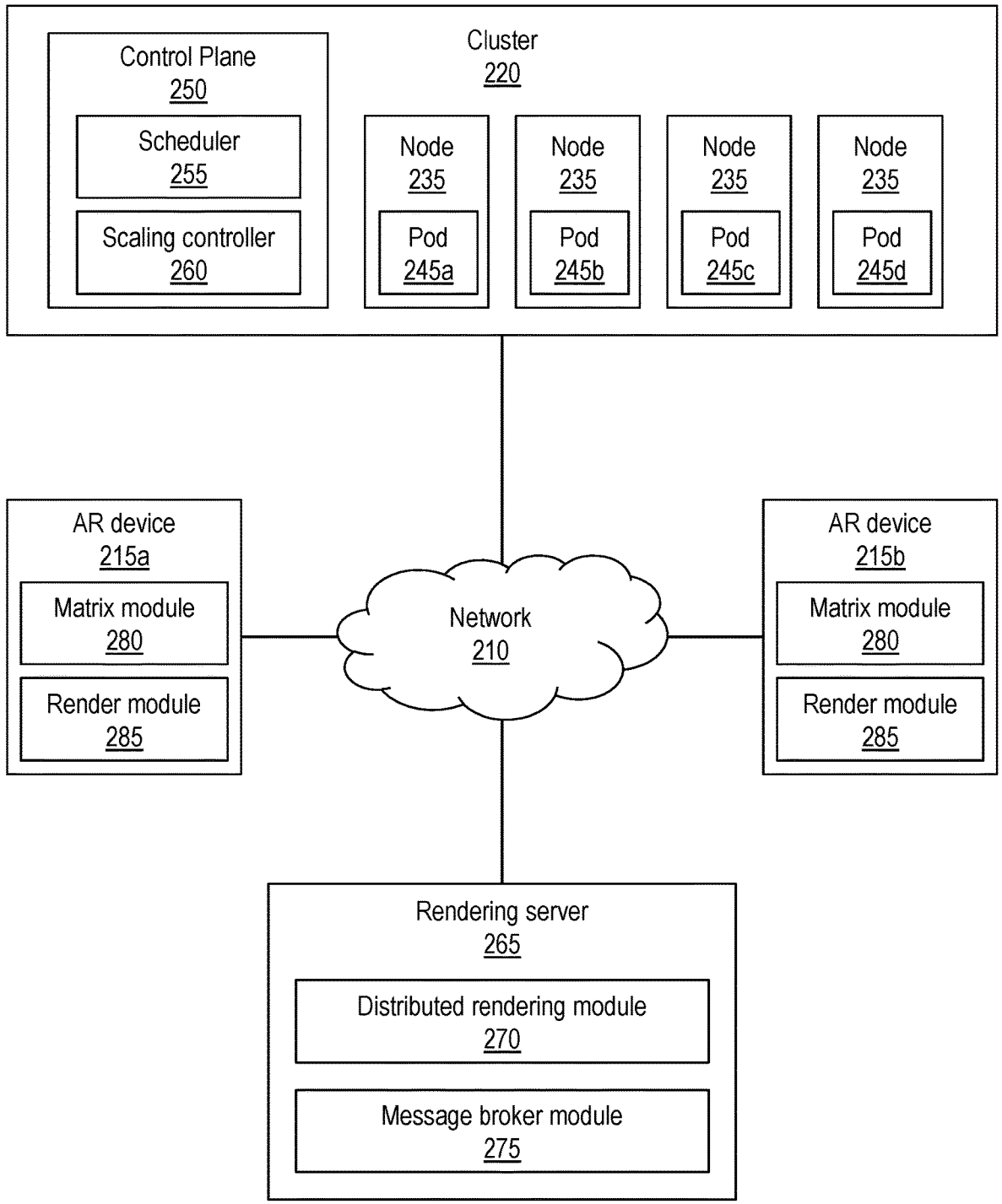
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes a network 210 that provides electronic communication between AR devices 215a, 215b and a cluster 220 that provides online services to the AR devices 215a, 215b. The network 210 may correspond to the WAN 102 of FIG. 1. Each of the AR devices 215a, 215b may correspond to instances of EUD 103 of FIG. 1. There are two AR devices 215a, 215b shown in the example of FIG. 2; however, there may be any number of AR devices 215a, 215b communicating with the cluster 220.

In embodiments, the cluster 220 is a computing cluster including nodes 235 that run containerized applications that provide online services to the AR devices 215a, 215b. In a particular example, the cluster 220 is a Kubernetes cluster. Each node 235 may comprise a computing device that hosts one or more pods 245a-d. As is understood in the art, pods contain one or more containers, such as Docker containers. The pods 245a-d run on nodes 235 and represent a single instance of a running process in the cluster 220. In the example shown in FIG. 2, one or more first pods 245a provide a first rendering service to the AR devices 215a, 215b. Similarly, one or more second pods 245b provide a second rendering service to the AR devices 215a. 215b, one or more third pods 245c provide a third rendering service to the AR devices 215a, 215b, and one or more fourth pods 245d provide a fourth rendering service to the AR devices 215a, 215b. There are four nodes 235 shown in the example of FIG. 2; however, there may be any number of the nodes 235 in the cluster 220, and there may be any number of pods on each node. Plural pods associated with the same service may run on different nodes, and plural pods associated with different services may run on the same node.

Still referring to FIG. 2, the cluster 220 includes a control plane 250 that manages the nodes 235 and the pods 245a-d in the cluster 220. The control plane 250 includes a scheduler 255 that watches for newly created pods with no assigned node and selects a node for them to run on. In embodiments, the control plane 250 also includes a scaling controller 260 that is configured to scale a workload for a service (e.g., rendering) to match demand for the service. In accordance with aspects of the invention, the scaling controller 260 may scale a workload for a service using horizontal scaling in which the scaling controller 260 deploys more pods to handle a workload. For example, in response to determining there is an increased demand for a service provided by the pods 245a-d, the scaling controller 260 may create additional instances of pods 245a-d to assist with the workload for this service.

In accordance with aspects of the invention, the environment 205 includes a rendering server 265. The rendering server 265 may comprise one or more instances of computer 101 of FIG. 1. Alternatively, the rendering server 265 may comprise one or more instances of virtual machines (VMs) or containers running on one or more instances of computer 101 of FIG. 1. In one example, the rendering server 265 is separate from the cluster 220. In another example, the rendering server 265 is included in the cluster 220, for example as part of the control plane 250.

In embodiments, the rendering server 265 of FIG. 2 comprises a distributed rendering module 270 and a message broker module 275, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The rendering server 265 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, each of the AR devices 215a, 215b comprises an augmented reality device that is configured to display (e.g., overlay) digital content on real-world scenes in real time. Augmented reality (AR) is a live direct or indirect view of a physical, real-world environment whose elements are augmented by computer-generated imagery. Augmented reality may be implemented in wearable display systems that are embodied in a wearable headset that is arranged to display an image within a short distance from a human eye. Such wearable headsets are sometimes referred to as head mounted displays (HMDs), AR glasses, and AR goggles. Optical components are arranged in a wearable headpiece so as to display the desired image within a few centimeters of the user's eyes. Augmented reality may also be implemented in a smartphone, in which the display of the smartphone displays an image of a real-world environment captured by a camera of the smartphone, and in which the display of the smartphone displays one or more virtual objects overlaid on the image of the real-world environment.

In embodiments, each of the AR devices 215a, 215b comprises a matrix module 280 that is configured to generate a space matrix of the view of the respective AR device. In embodiments, the matrix module 280 is programmed with one or more SLAM (simultaneous localization and mapping) algorithms that generate and update a space matrix for the AR device in real time. SLAM algorithms construct or update a map of an unknown environment while simultaneously keeping track of an agent's location within it. The matrix module 280 may utilize various SLAM algorithms usable with AR devices, including ARCore SLAM and ORB-SLAM, for example. In embodiments, the space matrix generated by the matrix module 280 comprises three components including a projection matrix, transformation matrix, and model matrix.

In embodiments, each of the AR devices 215a. 215b comprises a render module 285 that is configured to render digital objects that are displayed on a display of the AR device. In embodiments, the render module 285 receives plural different image files from different pods 245a-d of the cluster 220 and combines the different image files into a single digital object that is displayed on the display of the AR device. The image files may comprise different RGB (red-green-blue) binary files of different parts of a digital object, which the render module 285 integrates to reproduce the digital object for display on the AR device. In embodiments, different ones of the pods 245a-d generate the different image files, which are transmitted to the AR device and integrated at the AR device via the render module 285.

With continued reference to FIG. 2, in accordance with aspects of the invention, the distributed rendering module 270 is configured to cause different ones of the pods 245a-d to render different parts of a single digital object that will be displayed on one of the AR devices 215a, 215b. In embodiments, the distributed rendering module 270 receives a space matrix from one of the AR devices (e.g., AR device 215a), determines that a digital object is defined at a location within the view of the AR device (e.g., based on comparing a defined location of the digital object to the volumetric extent of the space matrix), and determines a number of different parts of the digital object to be rendered by different ones of the pods 245a-d. In embodiments, the distributed rendering module 270 instructs the determined pods 245a-d to render the respective parts of the digital object, receives respective image files of the respective parts of the digital object from the determined pods 245a-d, and transmits the image files to the AR device 215a. In this manner, the rendering server 265 and cluster 220 operate to perform distributed rendering of a digital object for the AR device 215a, wherein the distributed rendering comprises rendering different parts of a digital object using different pods 245a-d of the cluster 220, and wherein the distributed rendering is containerized because it is performed using containers in pods in a cluster.

Still referring to FIG. 2, in accordance with aspects of the invention, the message broker module 275 is configured to receive a space matrix from an AR device (e.g., AR device 215a) and to transmit the image files of the digital object to the AR device via messaging. The message broker module 275 may comprise message-oriented middleware, which is software or hardware infrastructure that supports sending and receiving messages between systems and devices in a distributed environment. The message broker module 275 may operate using Java Message Service (JMS), Advanced Message Queuing Protocol (AMQP), or other messaging protocols.

Figure 3:
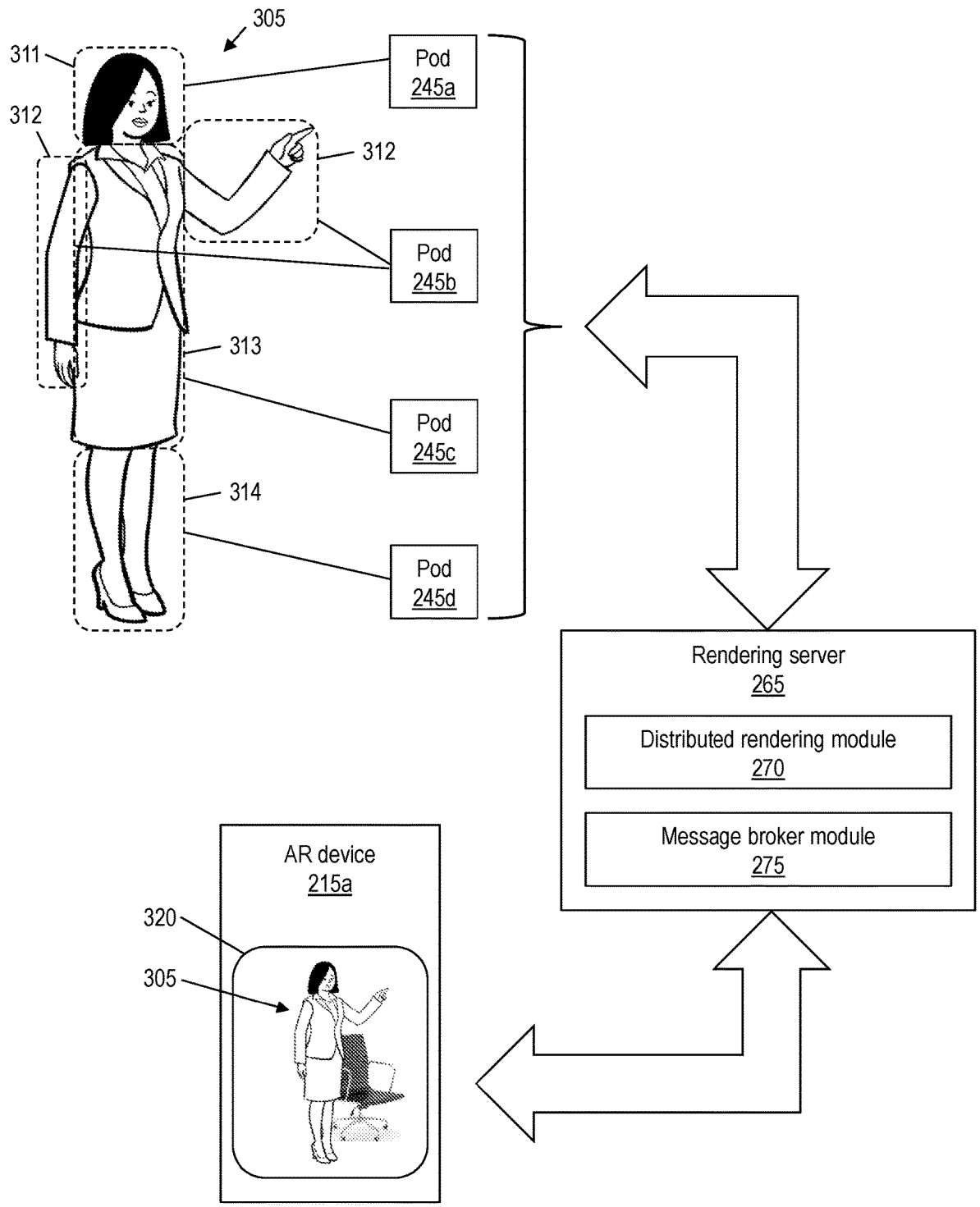
FIG. 3 shows an example of distributed rendering of a digital object in accordance with aspects of the present invention.

FIG. 3 shows an example of distributed rendering of a digital object in accordance with aspects of the present invention. In the example shown in FIG. 3, the AR device 215a sends its space matrix to the rendering server 265 via messaging to the message broker module 275. In this example, the distributed rendering module 270 determines from the space matrix that a digital object 305 is defined in the view of the AR device 215a. In this example, the digital object 305 comprises a digital human. In this example, the distributed rendering module 270 determines different parts 311, 312, 313, 314 of the digital object 305 to be rendered by different pods in the cluster 220 (not shown). In this example, the different parts include the head 311, arms 312, body 313, and legs 314 of the digital human digital object 305. In this example, the distributed rendering module 270 causes different ones of the pods 245a-d to render the different parts 311-314 of the digital object. In this example, pod 245a renders head 311, pod 245b renders arms 312, pod 245c renders body 313, and pod 245d renders legs 314. In this manner, different pods of the cluster perform the rendering of different parts of a single digital object. In this example, the pods 245a-d transmit image files of their respective rendering to the message broker module 275. The image files may comprise RGB binary files of the different parts 311, 312, 313, 314 of the digital object 305. In this example, the message broker transmits the different image files to the AR device 215a. In this example, the AR device 215a builds the digital object 305 by integrating the different image files and displays the digital object 305 on a display 320 of the AR device 215a. In this example, the AR device 215a displays the digital object 305 overlaid on an image of a real-world environment that includes a chair. The image of the real-world environment may be captured by one or more cameras of the AR device 215a.

Figure 4:
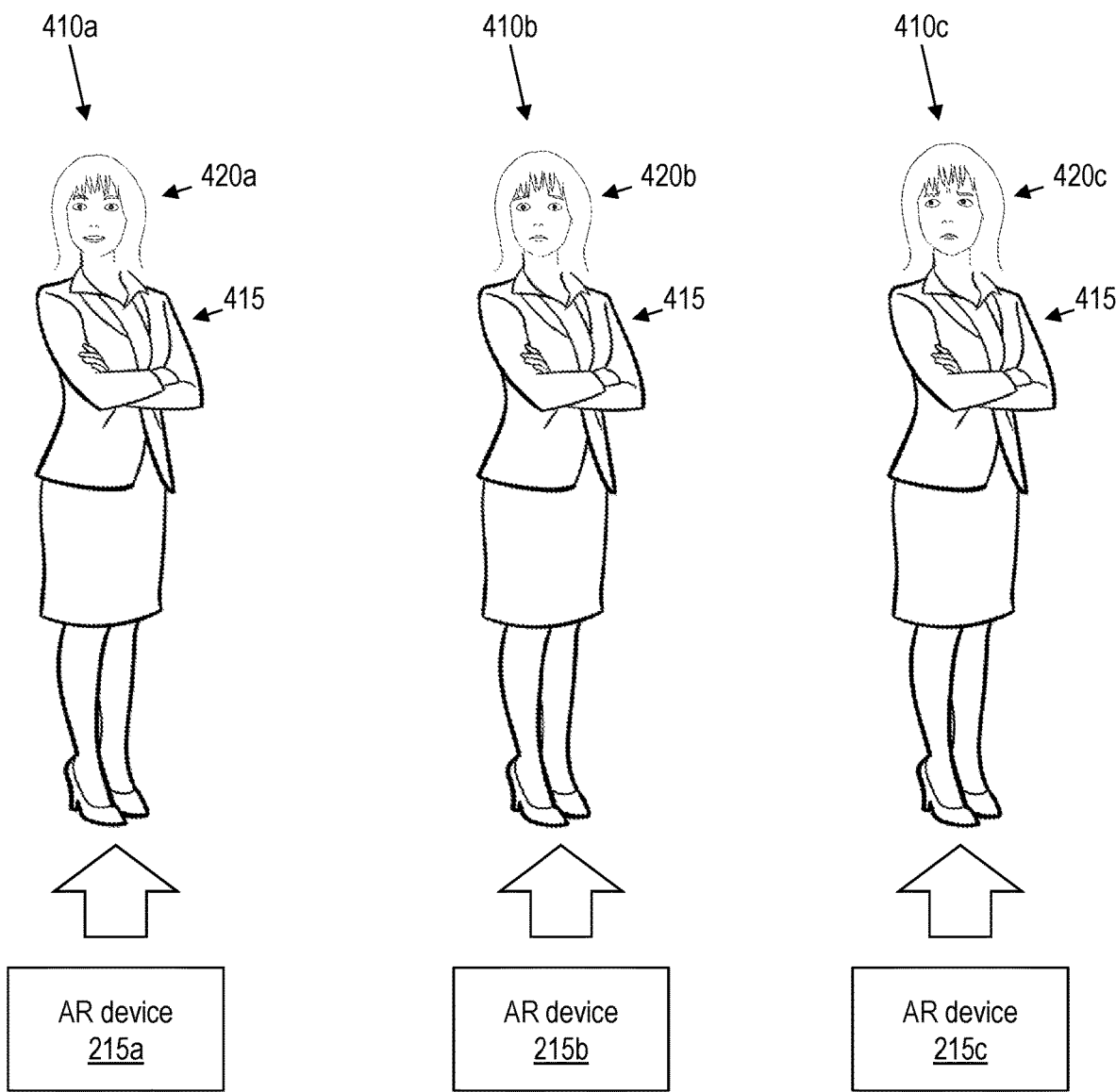
FIG. 4 shows an example of distributed rendering of plural different versions of a same digital object for plural AR devices in accordance with aspects of the present invention.

FIG. 3 illustrates an example of the system performing distributed rendering of a digital object for a single AR device. FIG. 4 shows an example of the system performing distributed rendering of plural different versions of a same digital object for plural AR devices 215a, 215b, 215c. In AR environments, it is possible for two AR devices to have their field of view overlap on a location that contains a digital object. For example, a digital object such as digital human may be anchored to a location in the AR environment using an anchor such as a cloud anchor, and the two or more AR devices may be located and oriented such that their fields of view overlap the location of the digital object. In this situation, it is desirable for each of the users of the different AR devices to be able to interact concurrently and uniquely with the digital object at this location. For example, the digital human may comprise a digital agent at an anchor point such as a desk of a train station, and each user may wish to interact with the digital agent individually and separate from the other users. Implementations of the invention address this need and others by performing distributed rendering of different versions of the digital object for the plural AR devices, wherein the distributed rendering includes rendering a first part of the digital object differently for each of the AR devices, and rendering at least one second part of the digital object the same for all the AR devices.

In the example shown in FIG. 4, each of the AR devices 215a, 215b, 215c has a field of view that overlaps a location of the same digital object. In this example, the rendering server 265 (not shown) causes different ones of the pods 245a-d (not shown) to render a different first part of the digital object and a same second part of the digital object for each of the AR devices 215a-c. In this example, the first part of the digital object is the head, and the second part of the digital object is the body. In this example, the digital object 410a for the first AR device 215a comprises a first version of the first part 420a combined with the second part 415, the digital object 410b for the second AR device 215b comprises a second version of the first part 420b combined with the second part 415, and the digital object 410c for the third AR device 215c comprises a third version of the first part 420c combined with the second part 415. In this example, each of the heads (e.g., first parts 420a-c) is unique in that they have different facial expressions, while each of the bodies (e.g., second part 415) is the same. In this manner, each of the users of the different AR devices 215a-c has a unique interaction with different versions of the same digital object.

Different ones of the pods 245a-d (not shown) may be used to render each unique part of the digital object for the plural AR devices. In the example shown in FIG. 4, and first pod (e.g., pod 245a) may perform the rendering of the first version of first part 420a for the first AR device 215a, a second pod (e.g., pod 245b) may perform the rendering of the second version of first part 420b for the second AR device 215b, a third pod (e.g., pod 245c) may perform the rendering of the third version of the first part 420c for the third AR device 215c, and a fourth pod (e.g., pod 245d) may perform the rendering of second part 415 for all three AR devices 215a-c. The second part 415 may be divided into plural separate parts and additional different pods may be used to render each of the separate parts. For example, the second part 215 (e.g., the body) may be divided into the arms, torso, and legs, and additional different pods may be used to render each of the arms, torso, and legs. In this example, the same arms, torso, and legs are sent to each of the AR devices 215a-c to produce the same second part 215, while a different first part 410a-c (e.g., head) is sent to each of the AR devices 215a-c.

Figure 5:
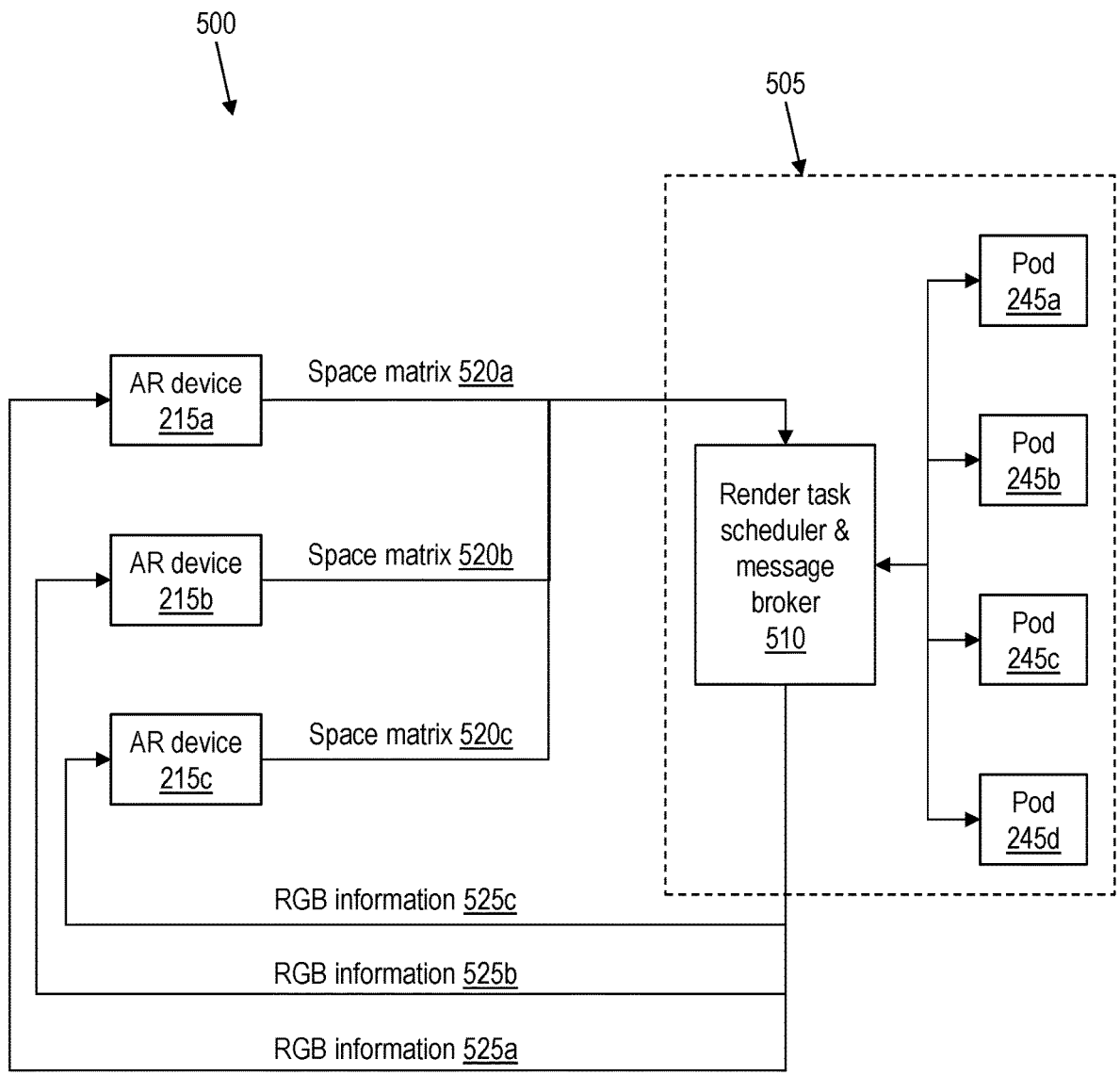
FIG. 5 shows a diagram of an exemplary system that provides distributed rendering to plural AR devices in accordance with aspects of the present invention.

FIG. 5 shows a diagram of an exemplary system 500 that provides distributed rendering to plural AR devices in accordance with aspects of the present invention. The system 500 may be used to provide the functionality described with respect to FIG. 4 and may include components of the environment of FIG. 2. In the example shown in FIG. 5, the system 500 includes a backend 505 that comprises the cluster 220 and rendering server 265 of FIG. 2. In the example shown in FIG. 5, the backend 505 includes a render task scheduler and message broker 510, which may comprise one or more programs or modules that perform the functions of the distributed rendering module 270 and the message broker module 275 of FIG. 2.

In the example shown in FIG. 5, each of the AR devices 215a, 215b, 215c generates a respective space matrix 520a, 520b, 520c using one or more SLAM algorithms. In this example, the render task scheduler and message broker 510 receives the respective space matrix 520a. 520b, 520c from each of the respective AR devices 215a, 215b, 215c via messaging protocol. In this example, the render task scheduler and message broker 510 determines parts of a digital object and causes the pods 245a-d to render the parts of the digital object. In this example, the render task scheduler and message broker 510 transmits respective RGB information 525a, 525b, 525c to each of the respective AR devices 215a, 215b, 215c via messaging protocol. In this example, each of the respective AR devices 215a, 215b, 215c integrates their received RGB information to render the digital object on that device.

In the context of the example of FIG. 4, the render task scheduler and message broker 510 of FIG. 5 causes pod 245a to render the first version of first part 420a, pod 245b to render the second version of first part 420b, pod 245c to render the third version of first part 420b, and pod 245d to render the second part 415. In this context, the RGB information 525a includes RGB information for the first version of first part 420a and the second part 415, the RGB information 525b includes RGB information for the second version of first part 420b and the second part 415, and the RGB information 525c includes RGB information for the third version of first part 420c and the second part 415. The render task scheduler and message broker 510 may cause the cluster 220 to use horizontal scaling to provision additional pods to perform the distributed rendering.

Figure 6:
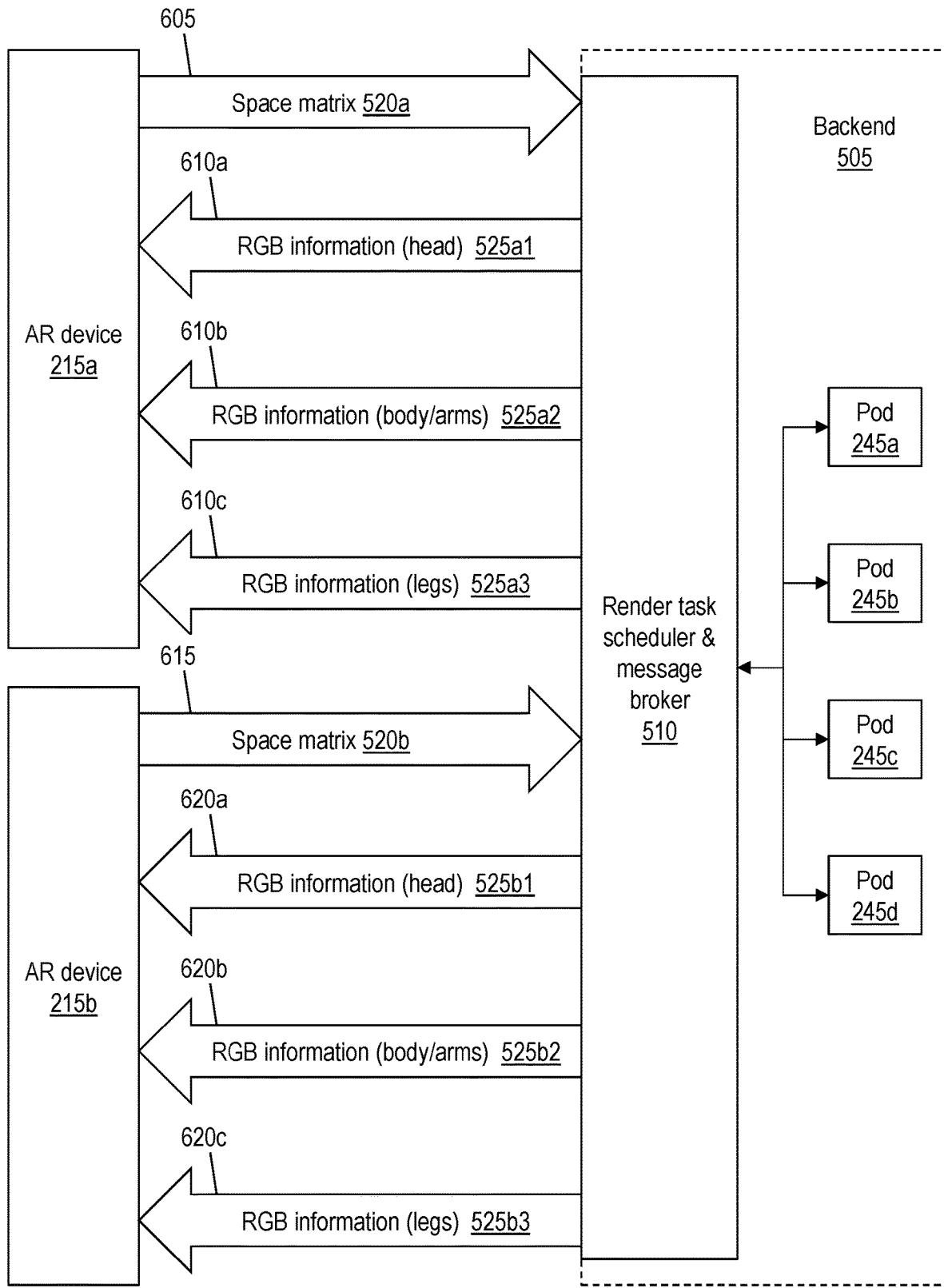
FIG. 6 shows an example of message queues used in distributed rendering in accordance with aspects of the present invention.

FIG. 6 shows an example of message queues used in distributed rendering in accordance with aspects of the present invention. FIG. 6 shows an example of the AR devices 215a, 215b transmitting and receiving messages to and from the render task scheduler and message broker 510 of the backend 505 of FIG. 5. In this example, AR device 215a transmits its space matrix 520a via an input message queue 605 of the message broker, and receives the different RGB information via three different output message queues 610a, 610b, 610c. In this example, RGB information 525a1 (e.g., for the head) is transmitted via output message queue 610a, RGB information 525a2 (e.g., for the body and arms) is transmitted via output message queue 610b, and RGB information 525a3 (e.g., for the legs) is transmitted via output message queue 610c. Similarly, AR device 215b transmits its space matrix 520b via an input message queue 615 of the message broker, and receives the different RGB information via three different output message queues 620a, 620b, 620c. In this example, RGB information 525b1 (e.g., for the head) is transmitted via output message queue 620a, RGB information 525b2 (e.g., for the body and arms) is transmitted via output message queue 620b, and RGB information 525b3 (e.g., for the legs) is transmitted via output message queue 620c.

In embodiments, each image file transmitted from the message broker (e.g., message broker module 275) to an AR device includes a timestamp. In embodiments, an AR device receiving plural image files in succession and via different output message queues uses the timestamps to group together the appropriate image files for integration into the digital object to be displayed on the AR device. The integration may include utilizing coordinates of the space matrix and dimensions/coordinates of the different parts of the digital object to combine the parts of the digital object into the single digital object at the appropriate location in the space matrix, so that the digital object is correctly displayed at the appropriate location in the field of view of the user of the AR device.

In embodiments, the space matrix generated by an AR device includes plural different matrices. The transformation matrix is unique to an individual AR device. However, under certain circumstances, the model matrix and the projection matrix can be the same for two different AR devices. As a result, one or more of the plural different matrices generated by a first AR device may be used by a second AR device that has a field of view that overlaps the field of view of the first AR device. In embodiments, two AR devices may be configured to communicate with each other to share the burden of generating the three matrices included in their respective space matrices. For example, the first AR device may determine its transformation matrix and the model matrix, and the second AR device may determine its transformation matrix and the projection matrix. In this example, the first AR device provides the model matrix to the second AR device, and the second AR device provides the projection matrix to the first AR device. Each AR device then has a full space matrix to send to the backend. In this manner, the computing load on each AR device is decreased.

Figure 7:
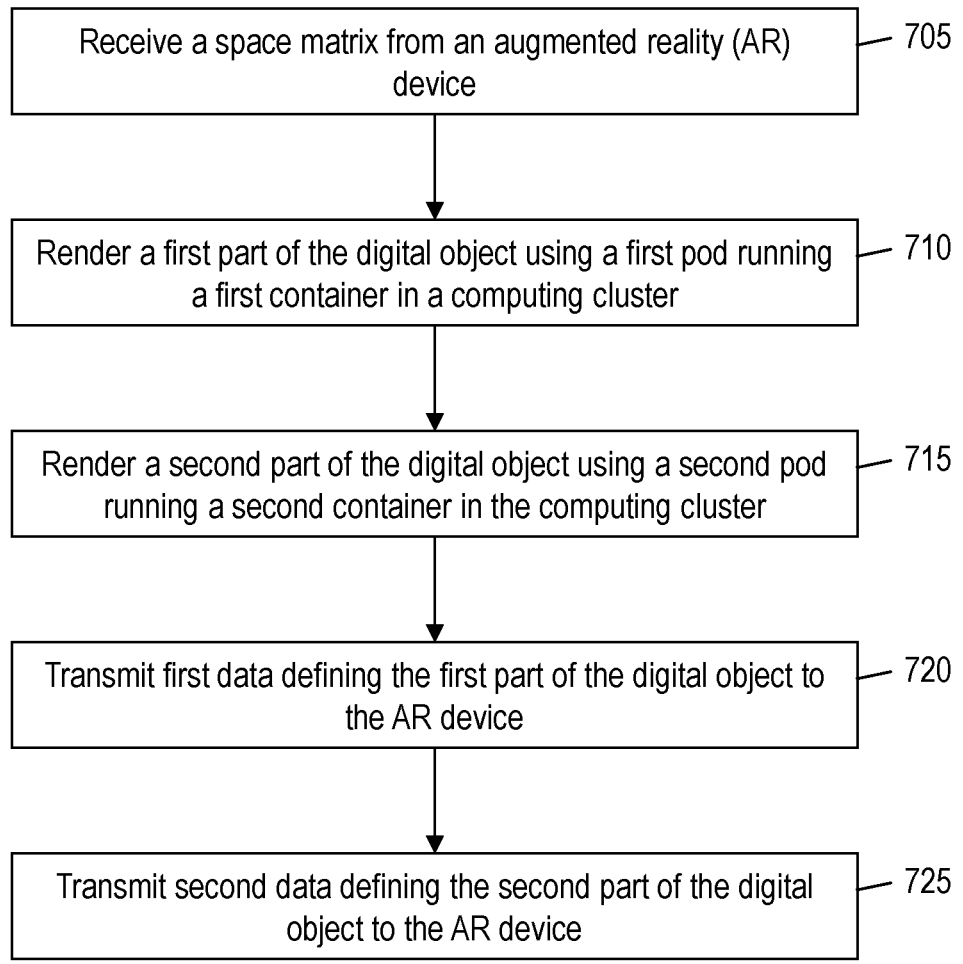
FIG. 7 shows a flowchart of an exemplary method in accordance with aspects of the present invention.

FIG. 7 shows a flowchart of an exemplary method in accordance with aspects of the present invention. Steps of the method may be carried out in one or more of the environments described herein and are described with reference to elements depicted in FIGS. 2-6. At step 705, the system receives a space matrix from an augmented reality (AR) device. In embodiments, the rendering server 265 receives a space matrix from the AR device 215a. At step 710, the system renders a first part of a digital object using a first pod in a computing cluster. In embodiments, the rendering server 265 causes a first pod 245a to render a first part 311 of a digital object 305. At step 715, the system renders a second part of the digital object using a second pod in the computing cluster. In embodiments, the rendering server 265 causes a second pod 245c to render a second part 313 of the digital object 305. Steps 710 and 715 together comprise the system performing distributed rendering of the digital object in response to receiving the space matrix from the AR device. At step 720, the system transmits first data defining the first part of the digital object to the AR device, and at step 725 the system transmits second data defining the second part of the digital object to the AR device. In embodiments, the rendering server 265 transmits image data to the AR device 215a, e.g., via different output queues of a messaging system.

Figure 8:
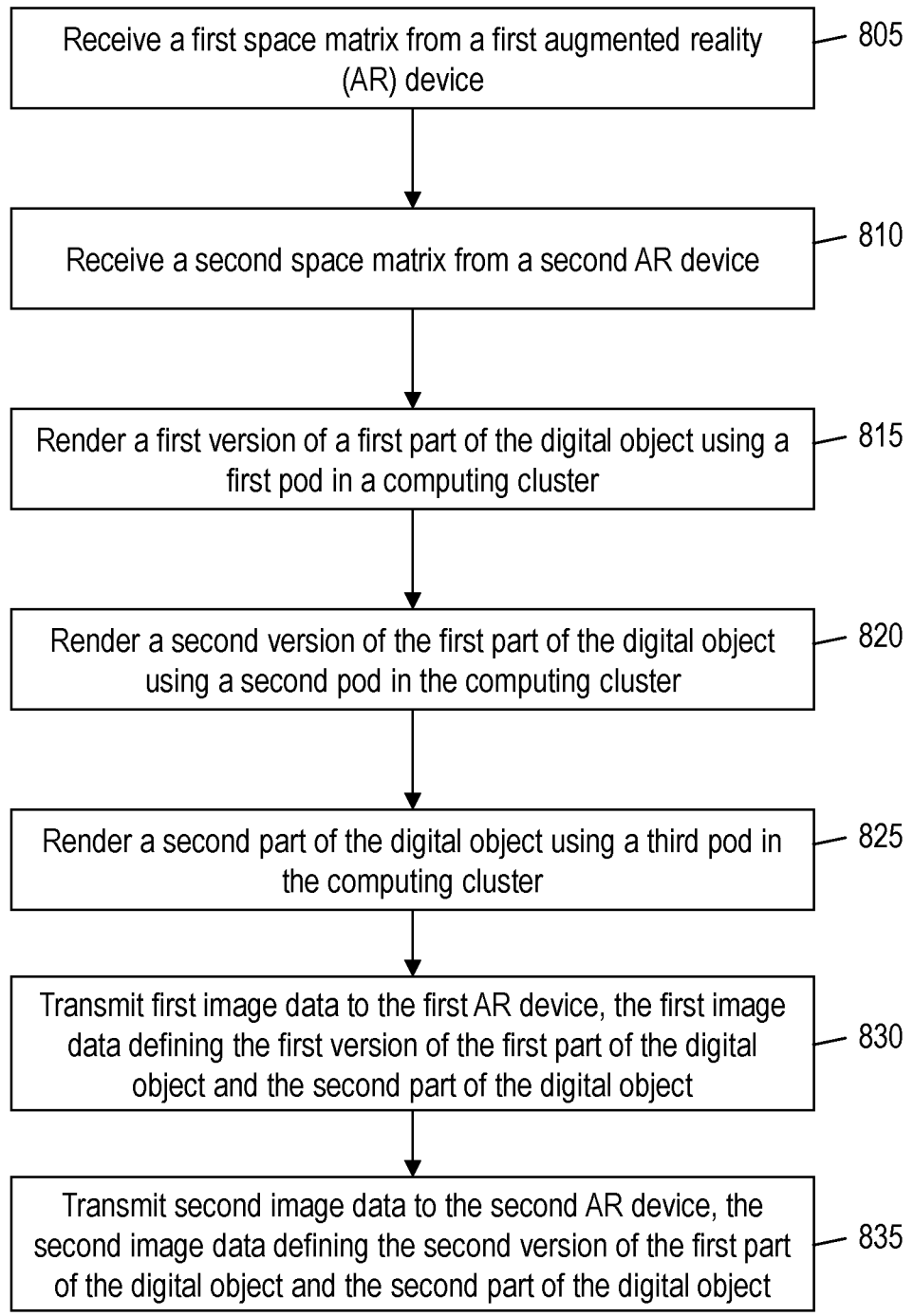
FIG. 8 shows a flowchart of an exemplary method in accordance with aspects of the present invention.

FIG. 8 shows a flowchart of an exemplary method in accordance with aspects of the present invention. Steps of the method may be carried out in one or more of the environments described herein and are described with reference to elements depicted in FIGS. 2-6. At step 805, the system (e.g., backend 505) receives a first space matrix from a first augmented reality (AR) device 215a. At step 810, the system receives a second space matrix from a second AR device 215b. At steps 815, 820, and 825, the system performs distributed rendering of a digital object for the first AR device and the second AR device in response to receiving the first space matrix and the second space matrix. At step 815, the system renders a first version of a first part of the digital object using a first pod in a computing cluster. At step 820, the system renders a second version of the first part of the digital object using a second pod in the computing cluster. At step 825, the system renders a second part of the digital object using a third pod in the computing cluster. At step 830, the system transmits first image data to the first AR device, the first image data defining the first version of the first part of the digital object and the second part of the digital object. At step 835, the system transmits second image data to the second AR device, the second image data defining the second version of the first part of the digital object and the second part of the digital object.

Figure 9:
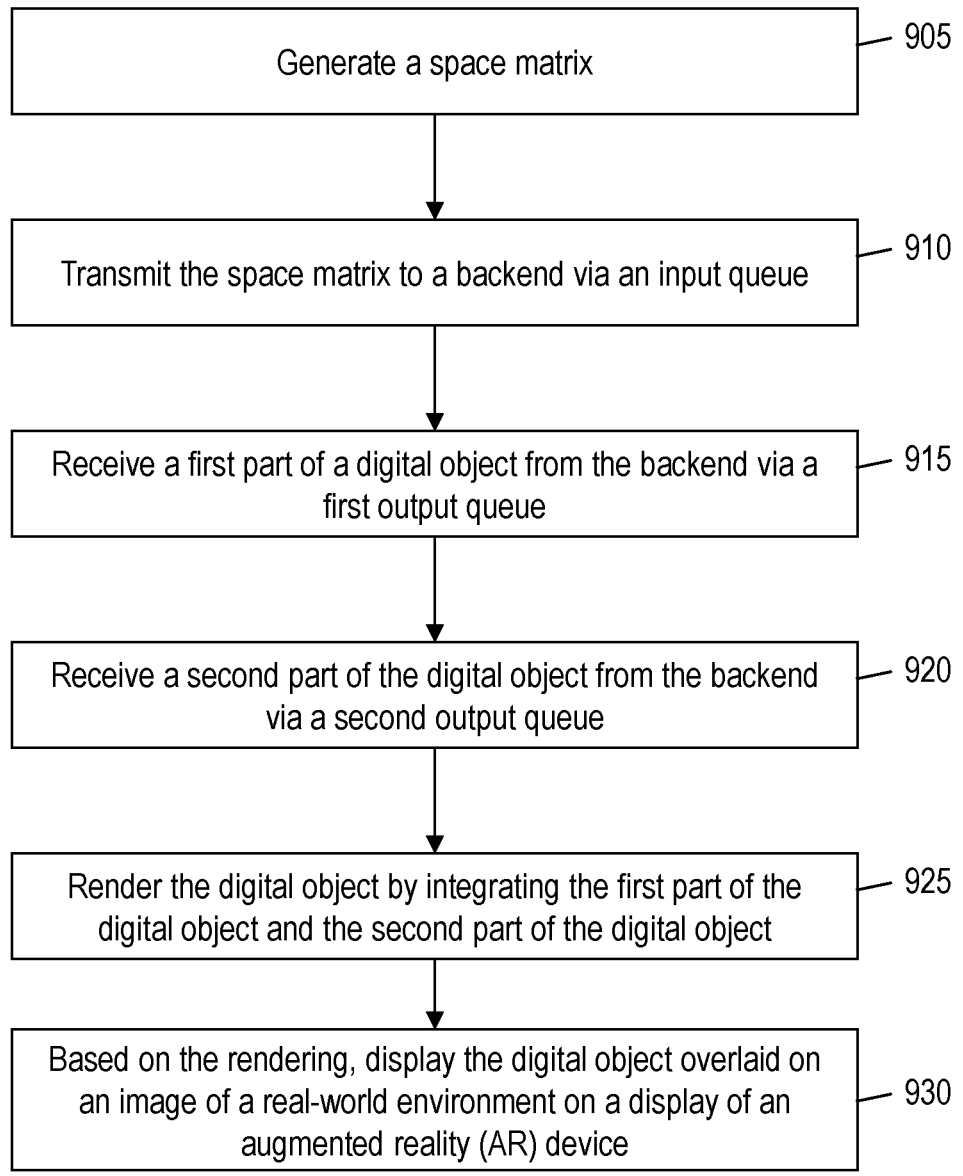
FIG. 9 shows a flowchart of an exemplary method in accordance with aspects of the present invention.

FIG. 9 shows a flowchart of an exemplary method in accordance with aspects of the present invention. Steps of the method may be carried out in one or more of the environments described herein and are described with reference to elements depicted in FIGS. 2-6. At step 905, the system (e.g., AR device 215a) generates a space matrix. At step 910, the system transmits the space matrix to a backend (e.g., 505) via an input queue of a messaging system. At step 915, the system receives a first part of a digital object from the backend via a first output queue of the messaging system. At step 920, the system receives a second part of the digital object from the backend via a second output queue of the messaging system. At step 925, the system renders the digital object by integrating the first part of the digital object and the second part of the digital object. At step 930, based on the rendering, the system displays the digital object overlaid on an image of a real-world environment on a display of the augmented reality (AR) device. The system can repeat this process in real time, e.g., to achieve a rate of ten frames per second, to provide a real time augmented reality experience for a user of the AR device.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving a space matrix from an augmented reality (AR) device;
in response to receiving the space matrix, performing distributed rendering of a digital object comprising:
rendering a first part of the digital object using a first pod running a first container in a computing cluster; and
rendering a second part of the digital object using a second pod running a second container in the computing cluster;
transmitting a first data defining the first part of the digital object to the AR device; and
transmitting a second data defining the second part of the digital object to the AR device.

2. The method of claim 1, wherein:
the first part of the digital object comprises a first portion of a digital human;
the second part of the digital object comprising a second portion of the digital human, the second portion is different from the first portion of the digital human;

the first data comprises first RGB (red-green-blue) data; and the second data comprises second RGB data.

3. The method of claim 1, wherein:
the first data comprises a first RGB binary file; and
the second data comprises a second RGB binary file.

4. The method of claim 1, wherein the AR device is configured to display the digital object by integrating the first part of the digital object and the second part of the digital object using the first data and the second data.

5. The method of claim 1, wherein:
the space matrix is received via an input queue of a message broker;
the first data is transmitted via a first output queue of the message broker; and
the second data is transmitted via a second output queue of the message broker, the second output queue being different than the first output queue.

6. The method of claim 1, wherein the digital object comprises a digital human.

7. The method of claim 6, wherein:
the first part of the digital object comprises a head of the digital human; and
the second part of the digital object comprises a body of the digital human.

8. The method of claim 7, further comprising:
receiving another space matrix from a second AR device;
rendering a different version of the first part of the digital object using a third pod running a third container in the computing cluster;
transmitting a third data defining the different version of the first part of the digital object to the second AR device; and
transmitting the second data defining the second part of the digital object to the second AR device.

9. The method of claim 1, further comprising:
rendering a third part of the digital object using a third pod running a third container in the computing cluster; and
rendering a fourth part of the digital object using a fourth pod running a fourth container in the computing cluster;
transmitting a third data defining the third part of the digital object to the AR device; and
transmitting a fourth data defining the fourth part of the digital object to the AR device,
wherein:
the digital object comprises a digital human;
the first part of the digital object comprises a head of the digital human;
the second part of the digital object comprises a body of the digital human;
the third part of the digital object comprises arms of the digital human; and
the fourth part of the digital object comprises legs of the digital human.

10. The method of claim 1, wherein the distributed rendering comprises horizontally scaling pods in the computing cluster.

11. The method of claim 1, wherein:
the first data is transmitted with a first timestamp; and
the second data is transmitted with a second timestamp.

12. The method of claim 1, wherein the space matrix comprises a projection matrix, transformation matrix, and a model matrix.

13. A computer program product comprising one or more computer readable storage media having program instructions collectively stored on the one or more computer readable storage media, the program instructions executable to:
receive a first space matrix from a first augmented reality (AR) device;
receive a second space matrix from a second AR device;
perform distributed rendering of a digital object for the first AR device and the second AR device in response to receiving the first space matrix and the second space matrix, the distributed rendering comprising:
render a first version of a first part of the digital object using a first pod in a computing cluster;
render a second version of the first part of the digital object using a second pod in the computing cluster; and
render a second part of the digital object using a third pod in the computing cluster;
transmit first image data to the first AR device, the first image data defining the first version of the first part of the digital object and the second part of the digital object; and
transmit second image data to the second AR device, the second image data defining the second version of the first part of the digital object and the second part of the digital object.

14. The computer program product of claim 13, wherein the digital object comprises a digital human.

15. The computer program product of claim 14, wherein:
the first part of the digital object comprises a head of the digital human;
the second part of the digital object comprises a body of the digital human.

16. The computer program product of claim 14, wherein:
the first space matrix is received via a first input queue of a messaging system;
the transmitting the first image data comprises:
transmitting first RGB data to the first AR device via a first output queue of the messaging system, the first RGB data defining the first version of the first part of the digital object; and
transmitting second RGB data to the first AR device via a second output queue of the messaging system, the second RGB data defining the second part of the digital object;
the second space matrix is received via a second input queue of the messaging system;
the transmitting the second image data comprises:
transmitting third RGB data to the second AR device via a third output queue of the messaging system, the third RGB data defining the second version of the first part of the digital object; and
transmitting the second RGB data to the second AR device via a fourth output queue of the messaging system.

17. A system, comprising:
a processor set, one or more computer readable storage media, and program instructions collectively stored on the one or more computer readable storage media, the program instructions executable to:
generate a space matrix;
transmit the space matrix to a backend via an input queue;
receive a first part of a digital object from the backend via a first output queue;
receive a second part of the digital object from the backend via a second output queue;

render the digital object by integrating the first part of the digital object and the second part of the digital object; and based on the rendering, display the digital object overlaid on an image of a real-world environment on a display of an augmented reality (AR) device.

18. The system of claim 17, wherein the program instructions are executable to:

receive a first timestamp with the first part of a digital object;

receive a second timestamp with the second part of a digital object;

perform the rendering the digital object based on the first timestamp and the second timestamp.

19. The system of claim 17, wherein:

the digital object comprises digital human;

the first part of the digital object comprises a head of the digital human; and the second part of the digital object comprises a body of the digital human.

20. The system of claim 17, wherein:

the first part of the digital object comprises a first portion of a digital human;

the second part of the digital object comprising a second portion of the digital human, the second portion is different from the first portion of the digital human;

the AR device generates the space matrix using a SLAM (simultaneous localization and mapping) algorithm;

the backend is configured to render the first part of the digital object and the second part of the digital object using different pods in a computing cluster.

* * * * *